H. G. DORSEY.
DEVICE FOR GRAPHICALLY REPRODUCING SOUND WAVES.
APPLICATION FILED SEPT. 29, 1910.

1,017,392.

Patented Feb. 13, 1912.
2 SHEETS—SHEET 1.

WITNESSES:
Edward Thorpe
P. A. Hoster

INVENTOR
Herbert G. Dorsey
BY
ATTORNEYS

H. G. DORSEY.
DEVICE FOR GRAPHICALLY REPRODUCING SOUND WAVES.
APPLICATION FILED SEPT. 29, 1910.
1,017,392.
Patented Feb. 13, 1912.
2 SHEETS—SHEET 2.
Fig. 5,
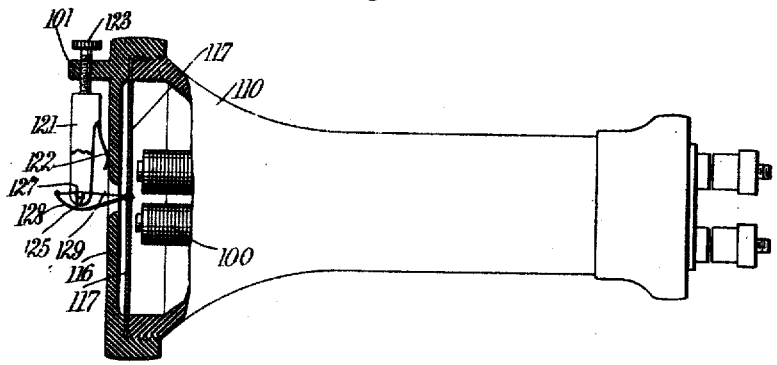
Fig. 6.
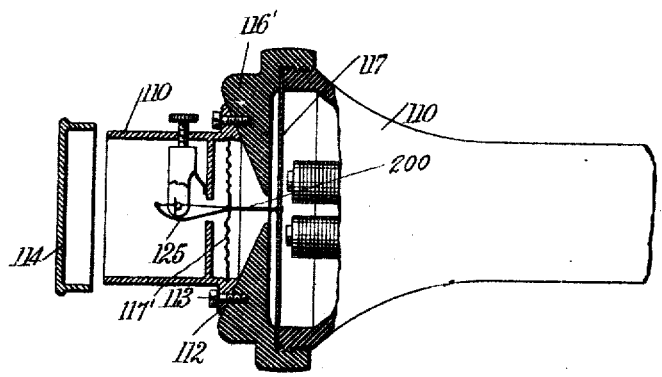
WITNESSES
Edward Thorpe
Lawrence J. Gallagher
INVENTOR
Herbert G. Dorsey
BY Munn & Co.
ATTORNEYS

UNITED STATES PATENT OFFICE.

HERBERT GROVE DORSEY, OF ITHACA, NEW YORK.

DEVICE FOR GRAPHICALLY REPRODUCING SOUND-WAVES.

1,017,392.  Specification of Letters Patent.  Patented Feb. 13, 1912.

Application filed September 29, 1910. Serial No. 584,452.

*To all whom it may concern:*

Be it known that I, HERBERT G. DORSEY, a citizen of the United States, and a resident of Ithaca, in the county of Tompkins and State of New York, have invented a new and Improved Device for Graphically Reproducing Sound-Waves, of which the following is a full, clear, and exact description.

An object of the invention is to provide a device for graphically reproducing sound waves, so that the same can be relatively compared and accurately measured. For the purpose mentioned use is made of a corrugated indented sound-receiving diaphragm, an adjustably mounted mirror, and a connection between the diaphragm and the mirror whereby the mirror will operate when sound waves are received on the diaphragm.

Although I am aware that sound-reproducing devices have been used heretofore, the inconsistency of the readings obtained and the intricacies of the constructions involved have made these devices unpractical for commercial use and experiment.

In order to obtain perfection in measuring sound waves, the mentioned waves must be accurately received and transmitted, so that each distinct feature of a plurality of waves can be quickly and easily noticed, and it is with this invention that I have obtained the desired result. With my device I first receive the sound on a diaphragm, transmit it to a movable mirror and then by the insertion of a revolving mirror or suitable lens, I project the sound waves graphically on to a screen or plate, thus insuring a graphic picture of the waves as they were previously received on the diaphragm.

Reference is to be had to the accompanying drawings, forming a part of this specification, in which similar characters of reference indicate corresponding parts in all the figures, and in which—

Figure 1:
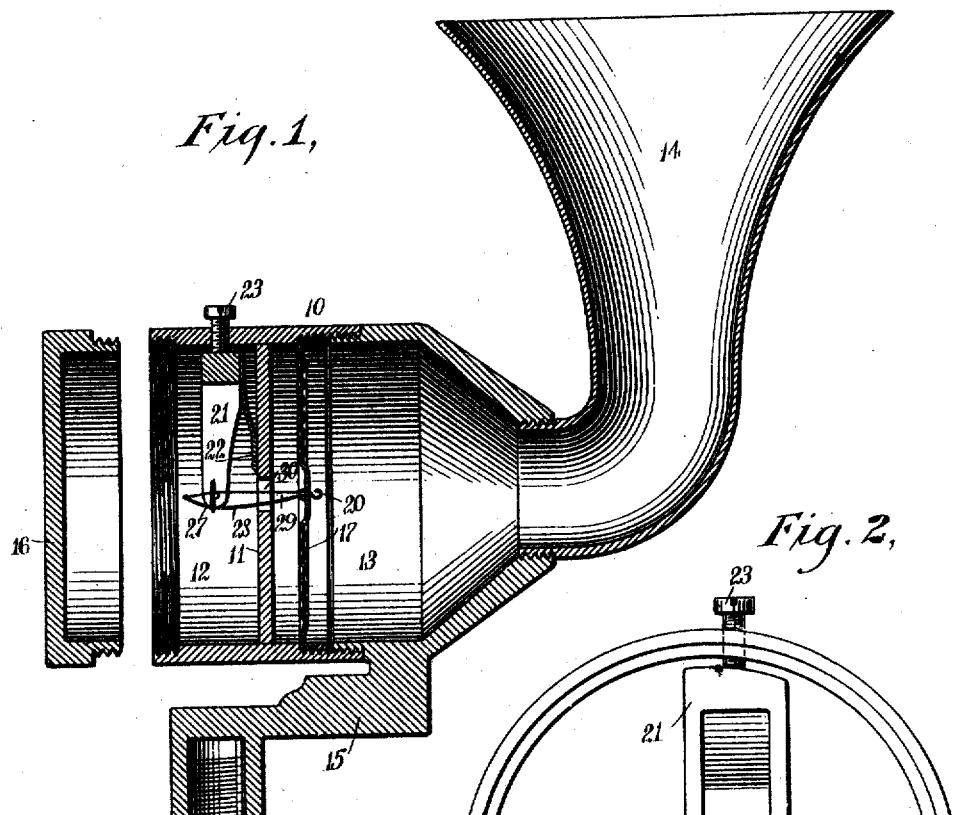
Figure 2:
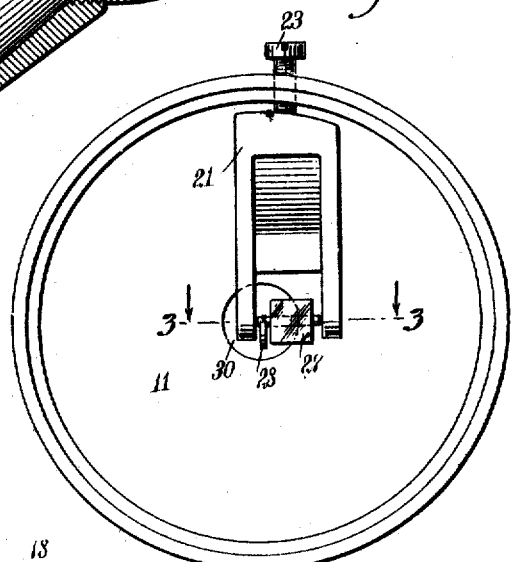
Figure 3:
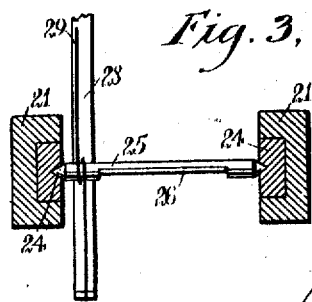
Figure 4:
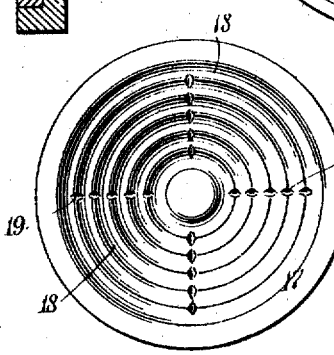

Figure 1 is a vertical sectional view showing the interior arrangement of my device; Fig. 2 is an end view looking into the device when the cover is removed and disclosing the adjustable mirror and adjacent operative parts; Fig. 3 is a sectional view taken on the line 3—3 in Fig. 2, and showing the spindle and transmitting bow; and Fig. 4 is a side elevation of the diaphragm adapted to primarily receive the sound waves. Fig. 5 is a side view, partly in section, of a telephone receiver having the cover thereof fitted with the spindle and bow; Fig. 6 is a view, partly in section, showing a telephone receiver having my device removably secured thereto.

Referring more particularly to the various drawings, I provide a circular casing 10, having therein a partition 11, forming separate compartments 12, 13 and a transmitting horn 14, screw-threadedly secured at one end of the compartment 13. An integral bracket 15 is provided for rigidly securing the casing 10, and a cover 16 is adapted to screw-threadedly engage the casing at one end thereof. A diaphragm 17 provided with annular corrugations 18 and transversely-extending indentations 19, is secured in the compartment 13 of the casing 10, and a hook 20 is centrally secured to one side of the diaphragm. A forked bridge 21 is mounted in the compartment 12 by means of a flexible member 22, and a screw 23 engages the casing 10 and the bridge 21, for adjusting the same. Mounted in suitable bearings 24 on the bridge 21, is a spindle 25 having a flattened portion 26 and secured to the said flattened portion is a mirror 27. A bow 28 provided with a flexible cord or wire 29 is secured to the diaphragm 17 with the cord 29 in engagement with the spindle 25, as will easily be seen in Fig. 3, the said bow and cord being adapted to extend through an aperture 30 in the partition 11.

In the operation of my device, sound waves enter the horn 14 and strike the diaphragm 17, which owing to its flexibility and sensitiveness, actuates the bow 28 to operate the mirror 27. Now, if a ray of light is cast upon the mirror 27 and reflected from the mirror 27 to a revolving mirror spaced from the mirror 27, and which in turn reflects the light on to a suitable screen, any movement of the mirror 27 will be reflected to the revolving mirror and on to the screen. If the revolving mirror were held in stationary position, only a spot of light would be cast upon the screen, but in view of the turning motion of the revolving mirror, the ray of light from the mirror 27 is projected on the screen in a line, which owing to the sound waves striking the diaphragm 17, will move upwardly and downwardly, the length and width of these vertical movements or strokes being proportional to the strength and periodicity of the sound waves striking the diaphragm 17.

By disposing a photographic film in place of the revolving mirror and placing the whole device in a dark room, the ray of light will be projected on to the film and a perfect photographic reproduction of the sound waves can be secured.

By securing a wire or cord to the hook 20 on the diaphragm 17 and subjecting the wire or cord to heat or cold, the co-efficient of expansion of the particular material employed can easily be ascertained. Thus it will be seen that aside from measuring sound waves, my device can also be accurately employed in physical research and the like.

My device is especially adapted for use in combination with a telephone receiver and in Figs. 5 and 6 I have illustrated two forms thereof. Referring particularly to Fig. 5, the casing 110 of the receiver contains the usual electromagnets 100, the diaphragm 117, such as is commonly used in these devices, being held in position by the removable cap or cover 116; this cap or cover may be provided with an integral bracket 101 through which the set screw 123 passes which is in engagement with the forked bridge 121 which is provided with the flexible member 122, as previously described. The bow 128 has one end secured to the diaphragm 117 in any suitable manner, the cord or wire 129 of the bow passing around and engaging the spindle 125 as previously set forth; the mirror 127 is suitably secured to the spindle, being actuated by the cord of wire 129. The cap or cover 116 with the bracket 101 thereon may be supplied with my device, thereby adapting it to be used with telephone receivers that are of a standard make. In this case the diaphragm 117 is actuated by the varying currents flowing around the electromagnets, this actuation giving rise to the movement of the mirror whereby the characteristics of the sound waves may be determined.

In Fig. 6 the casing 110 of the telephone receiver is provided with the usual cap or cover 116′, my device being contained within a suitable casing 110′, one end of which is provided with an annular shoulder or offset 112 through which a plurality of screws 113 are adapted to be passed in order to secure the casing to the cap 116′. The diaphragm 117′ of the device is in engagement with one end of the bow 125, as previously set forth, the diaphragm 117 of the receiver being connected to the first-mentioned diaphragm by means of an element 200 which is secured to each of these parts in any desirable and effective manner. The operation of this device is identical with what has been already described, it being noted that the diaphragm 117′ is vibrated similarly to the diaphragm 117 of the receiver through the medium of this element. If so desired, a cover 114 may be provided therefor in order to protect the parts when not in use. By providing a casing similar to that indicated at 110 with the bow and the spindle mounted in the bridge thereon, the device is well adapted for attachment to and use with telephone receivers as they are now made.

While I have shown three adaptations of my device, one of which is adapted to be actuated directly by sound waves and the other two by vibration of a diaphragm caused by varying electric currents, it is clear that other methods of actuating the diaphragm and devices with which the invention may be used will suggest themselves to a person skilled in this art, such constructions falling within the spirit of my invention and being included within the scope of the appended claims.

Having thus described my invention, I claim as new and desire to secure by Letters Patent:—

1. A device of the class described comprising a corrugated indented diaphragm with the indentations crossing the corrugations, an adjustable mirror, and means connecting the diaphragm and the said mirror for operating the mirror when the diaphragm is actuated.

2. A device of the class described comprising a diaphragm, circular corrugations on the diaphragm with radial indentations crossing the said corrugations, a mirror, means for adjustably supporting the mirror, and a bow connecting the diaphragm and the mirror for operating the mirror when the diaphragm is actuated.

3. A device of the class described comprising a casing having a tapered end, a diaphragm therein, the said diaphragm being corrugated in one direction and having indentations crossing the said corrugations, a mirror mounted on the casing, means for adjusting the mirror, means connecting the mirror and diaphragm for operating the mirror when the diaphragm is actuated, a horn for attachment to the said tapered end of the casing and a bracket integrally formed on the casing and depending therefrom.

4. A device of the class described comprising a casing, a diaphragm therein, the said diaphragm being corrugated in one direction and having indentations crossing the said corrugations, a mirror mounted on a spindle on the casing, means for adjusting the mirror, and a bow connecting the diaphragm and the said mirror for operating the mirror when the diaphragm is actuated, the said bow consisting of a curved rod having a flexible member connected to its ends with the said member encircling the spindle of the mirror intermediate the ends of the bow.

5. A device of the class described comprising a corrugated diaphragm provided with indentations crossing the corrugations and in lines relatively at right angles, a mirror, means for adjusting the mirror and means connecting the diaphragm and said mirror for operating the mirror when the diaphragm is actuated.

6. A device of the class described comprising a casing, a diaphragm therein, a forked bridge mounted in the casing, means for adjusting the bridge exteriorly of the casing, a mirror mounted on a spindle pivotally carried by the bridge, and a bow secured to the diaphragm and engaging the said spindle, to operate the same.

7. In a device of the class described, a casing, a diaphragm mounted in the casing, a bridge in the casing, a spindle on the bridge, a mirror supported on the spindle, together with a bow connecting the said diaphragm and the said spindle for moving the mirror when the diaphragm is actuated, the said bow being made up of a rod having a flexible member connected to its ends, the said member encircling the spindle between the ends of the said rod.

8. In a device of the class described, a casing, a diaphragm mounted within the casing, a bridge within the casing, a spindle on the bridge, a mirror mounted on the spindle, and a bow comprising a flexible member, one end of the bow being connected to and actuated by the said diaphragm, the said flexible member being in engagement with the periphery of the said spindle whereby movement of the diaphragm is transmitted to the said spindle.

9. In a device of the class described, a casing, a corrugated diaphragm mounted in the casing and provided with radial lines of indentations, each of the said indentations in each line being disposed on one of the said corrugations, a forked bridge in the casing, a spindle on the bridge, a mirror movably mounted on the spindle, and a bow connecting the said diaphragm and said spindle for moving the mirror when the diaphragm is actuated, the said bow consisting of a rod having a flexible member encircling the spindle between the ends of the said rod.

In testimony whereof I have signed my name to this specification in the presence of two subscribing witnesses.

HERBERT GROVE DORSEY.

Witnesses:
  VIRGINIA R. DORSEY,
  E. J. DORSEY.